(12) United States Patent
Roberts et al.

(10) Patent No.: US 11,553,102 B1
(45) Date of Patent: Jan. 10, 2023

(54) MULTI-FUNCTION DEVICES TO POPULATE PARAMETERS FOR CONFIGURATION FILES VIA COMMUNICATION WITH NETWORKED MULTI-FUNCTION DEVICES

(71) Applicant: Xerox Corporation, Norwalk, CT (US)

(72) Inventors: Russell R. Roberts, Webster, NY (US); James Weise, Rochester, NY (US); Michael W. Barrett, Fairport, NY (US); Kim P. Ciulla, Bloomfield, NY (US); Emily Katherine Anzalone, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/653,425

(22) Filed: Mar. 3, 2022

(51) Int. Cl.
*H04N 1/00* (2006.01)

(52) U.S. Cl.
CPC ..... *H04N 1/00973* (2013.01); *H04N 1/00347* (2013.01); *H04N 1/00472* (2013.01); *H04N 2201/0094* (2013.01)

(58) Field of Classification Search
CPC ........... H04N 1/00973; H04N 1/00347; H04N 1/00472; H04N 2201/0094
See application file for complete search history.

(56) References Cited

U.S. PATENT DOCUMENTS

| | | | | |
|---|---|---|---|---|
| 2005/0111039 | A1* | 5/2005 | Yoshida | G06F 3/1203 358/1.15 |
| 2015/0193175 | A1* | 7/2015 | Mori | G06F 3/1258 358/1.15 |
| 2015/0301767 | A1* | 10/2015 | Morita | G06F 3/1205 358/1.13 |
| 2016/0054956 | A1* | 2/2016 | Otsuka | G06F 3/1231 358/1.13 |

* cited by examiner

*Primary Examiner* — Iriana Cruz

(57) ABSTRACT

A multi-function device (MFD) is disclosed. For example, the MFD includes a communication interface to establish a communication path with a network, a user interface to display a plurality of fields associated with different settings of a configuration file of the MFD, a processor, and a non-transitory computer-readable medium storing a plurality of instructions. The instructions when executed by the processor cause the processor to detect selection of a field associated with a setting of the configuration file, establish a connection with at least one networked MFD on the network, query the at least one networked MFD for a value used in the field associated with the setting of the configuration file that is selected, receive the value from the at least one networked MFD, and populate the field with the value.

20 Claims, 6 Drawing Sheets

MULTI-FUNCTION DEVICES TO POPULATE PARAMETERS FOR CONFIGURATION FILES VIA COMMUNICATION WITH NETWORKED MULTI-FUNCTION DEVICES

The present disclosure relates generally to multi-function devices and relates more particularly to a method and apparatus to populate parameters for configuration files via communication with networked multi-function devices.

BACKGROUND

Multi-function devices (MFDs) are devices that can perform a variety of different functions. The MFDs can print, scan, copy, fax, email documents, and the like. The MFDs can provide a variety of different options to perform the various job requests, such as different colors, different paper sizes, changing a print quality, changing a size of the image and/or text to be printed, stapling, collating, providing different email addresses, selecting which network storage service to send the scanned document to, and the like.

Thus, MFDs are complex devices that may involve many different configuration settings to operate properly. The configuration settings may determine how the MFD communicates over a particular communication network, how the MFD communicates with other endpoint devices, how the software presents a graphical user interface, and the like.

SUMMARY

According to aspects illustrated herein, there are provided a multi-function device (MFD) and a method for automatically populating parameters for configuration files via communication with networked MFDs. One disclosed feature of the embodiments is an MFD that comprises a communication interface to establish a communication path with a network, a user interface to display a plurality of fields associated with different settings of a configuration file of the MFD, a processor, and a non-transitory computer-readable medium storing a plurality of instructions. The instructions when executed by the processor cause the processor to detect selection of a field associated with a setting of the configuration file, establish a connection with at least one networked MFD on the network, query the at least one networked MFD for a value used in the field associated with the setting of the configuration file that is selected, receive the value from the at least one networked MFD, and populate the field with the value.

Another disclosed feature is a method for automatically populating parameters for configuration files via communication with networked MFDs. The method executed by a processor of the MFD comprises detecting a selection of a field associated with a setting of a configuration file, establishing a connection with at least one networked MFD on a network, querying the at least one networked MFD for a value used in the field associated with the setting of the configuration file that is selected, receiving the value from the at least one networked MFD, and populating the field with the value.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
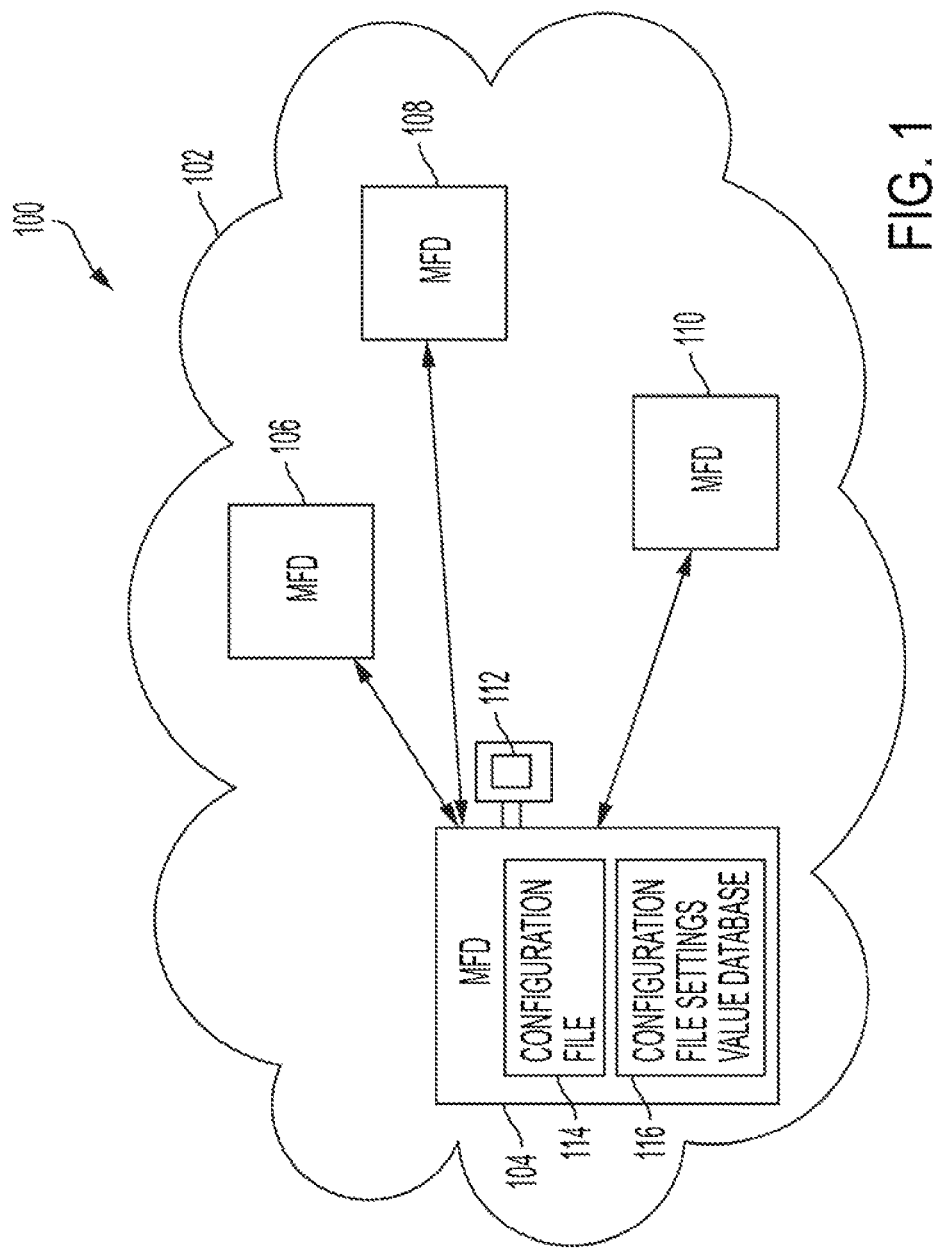
FIG. 1 illustrates a block diagram of an example network that includes a multi-function device (MFD) to set parameters for configuration files via communication with networked MFDs of the present disclosure.

The present disclosure broadly discloses a method and apparatus for automatically populating parameters for configuration files via communication with networked multi-function devices (MFDs). As discussed above, MFDs are complex devices that may involve many different configuration settings to operate properly. The configuration settings may determine how the MFD communicates over a particular communication network, how the MFD communicates with other endpoint devices, how the software presents a graphical user interface, and the like.

An experienced technician may be able to easily configure all of the settings of the MFD. However, some companies may have large amounts of turnover and use inexperienced technicians that may not be familiar with all of the values for each setting of the configuration files of the MFD. As a result, configuring the MFD to be ready to operate and/or communicate within the network may be slow and inefficient.

The present disclosure provides an apparatus and method that allows the MFD to communicate with other networked MFDs to obtain values for different settings or parameters of a configuration file. For example, when a technician has opened a configuration file, the configuration file may have a plurality of different fields to enter values for the different settings. When a user clicks on a field, the MFD may communicate with other networked MFDs to obtain used values for the selected setting. The MFD may then populate the field with the most popular value that is used for the selected setting based on polling the other networked MFDs.

In one embodiment, the MFD may present a list of possible values to the technician on a user interface. For example, the list may be presented as a pop-up window on the user interface. The list of values may be organized from most used value to least used value.

In one embodiment, the MFD may present values from MFDs that have a similar model number. For example, different model MFDs may use different settings. Thus, the values presented to the technician may not be the most popular or most used values, but may be values received from a networked MFD that has a same or similar model number.

In one embodiment, the MFD may have a timer that expires before presenting the values obtained from the other networked MFDs. For example, the technician may find it annoying if a pop-up window appears after selecting each field in the configuration file. The technician may know the values to enter for most of the fields. However, if the technician is not sure, the technician may hover or select a field and not provide any input until the timer expires. In response, the MFD may present a list of values, assuming that the technician does not know what value to use if no input is provided before expiration of the timer.

Thus, the present disclosure may automatically provide values and populate settings of a configuration file. This may help expedite configuration of MFDs in the field when they are initialized or reset for technicians, and especially for inexperienced technicians. Thus, configuration of the MFDs may be made more efficient.

FIG. 1 illustrates an example network 100 of the present disclosure. In one embodiment, the network 100 may include an Internet protocol (IP) network 102. The IP network 102 may include a plurality of networked multi-function devices (MFDs) 104, 106, 108, and 110. Although four MFDs are illustrated in FIG. 1, it should be noted that any number of MFDs may be deployed in the IP network 102.

In one embodiment, the MFDs 104, 106, 108, and 110 may be networked together on a common network. For example, the IP network 102 may be a particular Wi-Fi network, and the MFDs 104, 106, 108, and 110 may be connected to the same Wi-Fi network. In another embodiment, the MFDs 104, 106, 108, and 110 may be connected via a wired (e.g., an Ethernet connect) or a wireless connection to an enterprise local area network (LAN). In another example, the MFDs 104, 106, 108, and 110 may be part of a company network that spans different geographic locations but is part of a private network of the enterprise. In other words, the MFDs 104, 106, 108, and 110 may be grouped together such that each MFD 104, 106, 108, and 110 can communicate with the others over the IP network 102.

In one embodiment, each of the MFDs 104, 106, 108, and 110 may be a device that can perform a variety of different job functions. For example, each MFD 104, 106, 108, or 110 may be able to perform print, copy, fax, scan, and email document functions.

In one embodiment, the IP network 102 may be any type of communication network that can transfer data using internet protocols. The IP network 102 may be the Internet, for example. The IP network 102 has been simplified for ease of explanation and may include additional network elements that are not shown. For example, the IP network 102 may include firewalls, gateways, switches, border elements, access networks, and the like.

In one embodiment, the MFD 104 may include a display 112 that can present a user interface. The MFD 104 may include a configuration file 114 and a configuration file settings value database 116 (also referred to herein as database 116). As noted above, a technician may be deployed to populate values for settings in the configuration file 114. However, the technician may not know what values to enter in the fields for some of the settings.

In one embodiment, the MFD 104 may communicate with the MFDs 106, 108, and 110 to request and receive values for various settings. The MFD 104 may store those values in the database 116 to be presented to the user or technician, may present the values to the user via the user interface shown on the display 112 to allow the user to select one of the values, or may simply automatically populate the of the configuration file 114 fields with values. As discussed in further detail below, the values may be presented in an ordered list based on the values that are most used by the MFDs 106, 108, and 110.

In another example, the values that are presented may be based on the MFDs 106, 108, and 110 that have a similar model number as a model number of the MFD 104. For example, the MFD 106 may have the same model number as the MFD 104. Thus, the value used for a setting in the configuration file 114 for the MFD 106 may be used by the MFD 104. The value may be used even though it is not the most frequently used value. For example, the MFDs 108 and 110 may have different model numbers, but use a different value (e.g., the different value used two times versus used only once for the value used by the MFD 106) than the value used by the MFD 106.

In another embodiment, the values may be received in advance and stored in the database 116. The values from the database 116 for the various settings of the configuration file 114 may then be presented to the user. The MFD 104 may periodically communicate with the MFDs 106, 108, and 110 to update the values in the database 116.

Figure 2:
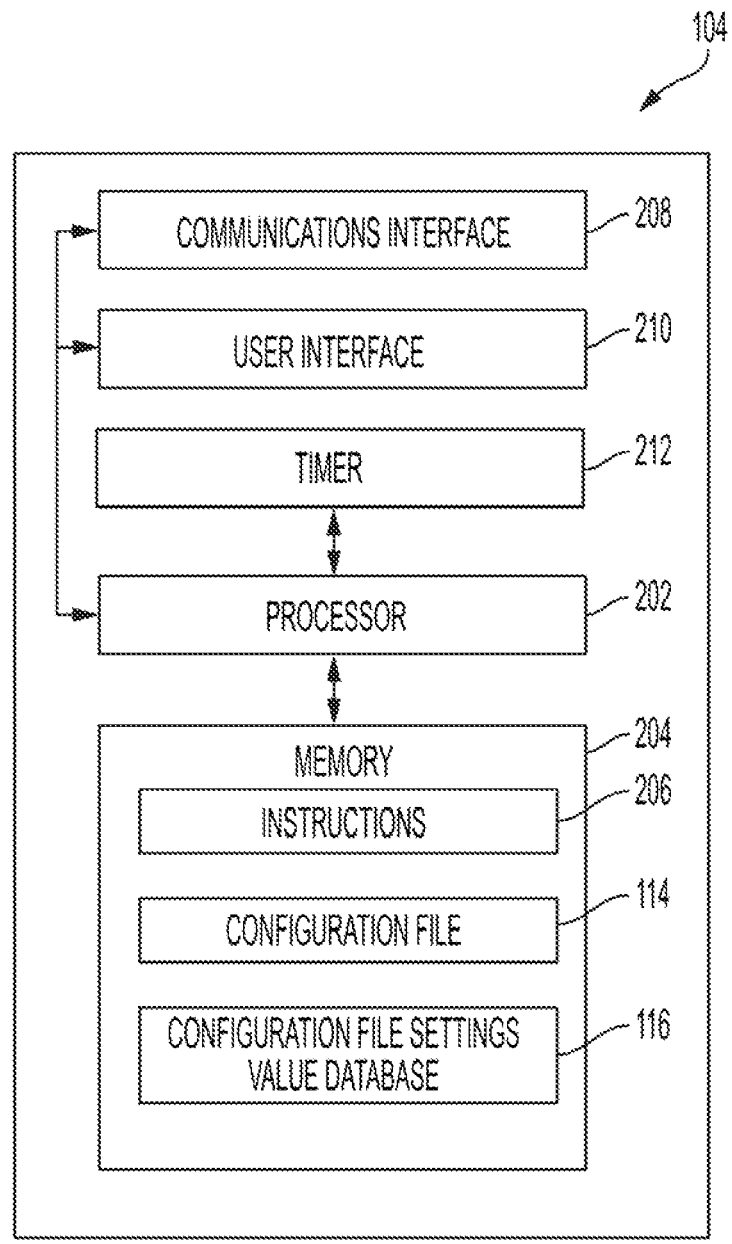
FIG. 2 illustrates a block diagram of an example MFD of the present disclosure.

FIG. 2 illustrates a block diagram of an example of the MFD 104. However, the MFDs 106, 108, and 110 may be similar to the MFD 104 and may include similar components. In one embodiment, the MFD 104 may include a processor 202, a memory 204, a communications interface 208, a user interface 210, and a timer 212. The processor 202 may be communicatively coupled to the memory 204, the communications interface 208, the user interface 210, and the timer 212. The processor 202 may control operation of and/or transmit/receive data via the communications interface 208, and/or the user interface 210.

In one embodiment, the communications interface 208 may be to establish a communication path between the MFD 104 and the other MFDs 106, 108, and 110 via the IP network 102. For example, the communications interface 208 may be a wireless or wired communication interface. For example, the communications interface 208 may be a WiFi radio, an Ethernet connection, a fax over IP connection that uses an RJ-111 connection, a cellular radio, and the like.

Figure 3:
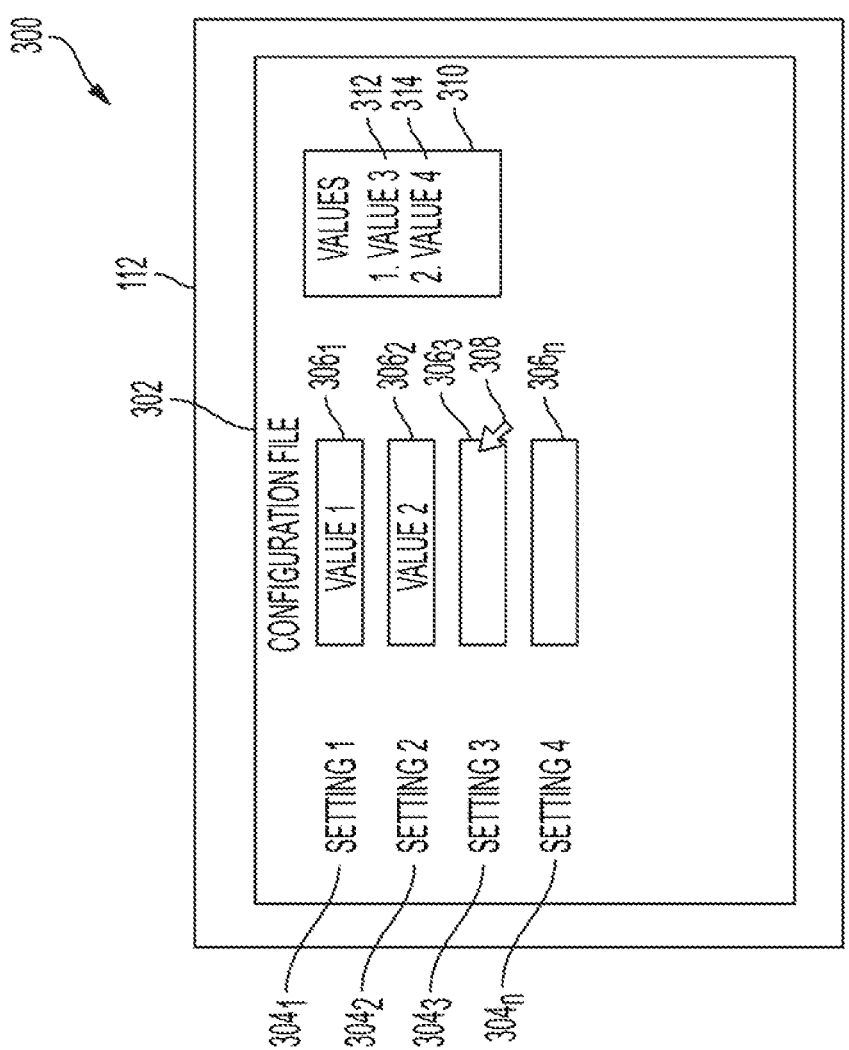
FIG. 3 illustrates an example screen shot of a graphical user interface that shows settings for a configuration file that is automatically populated with a value by the MFD via communication with networked MFDs.
Figure 4:
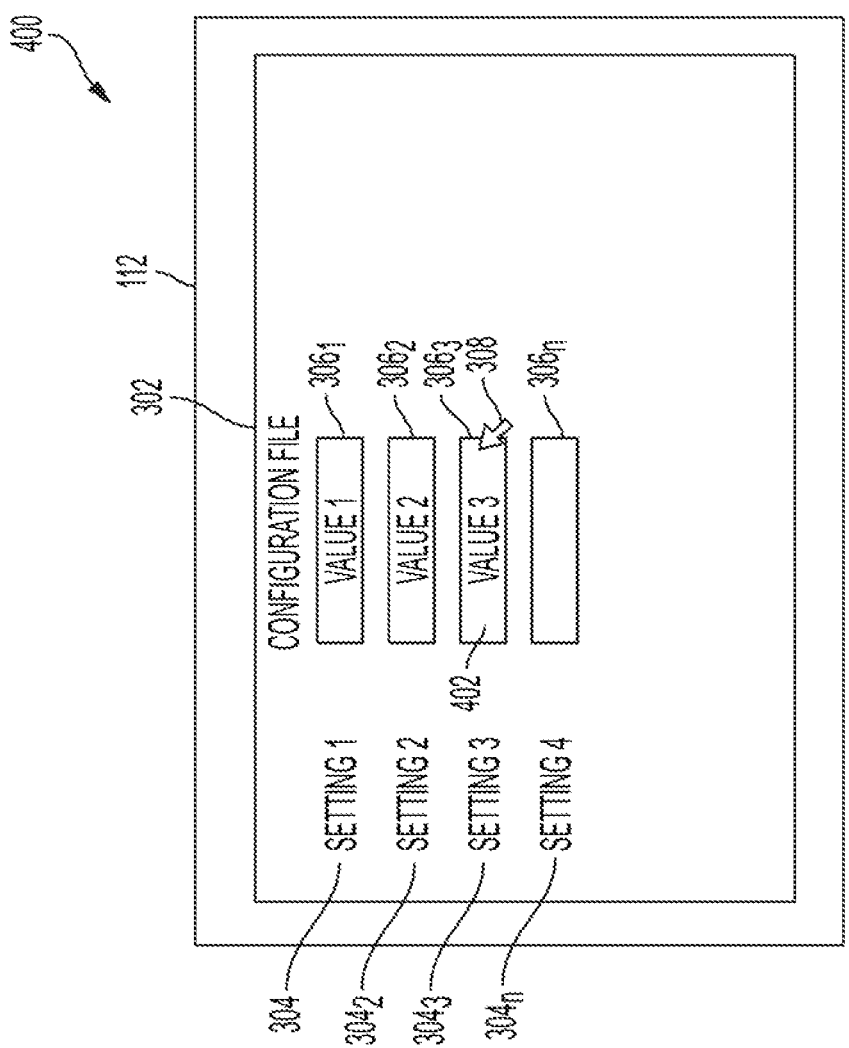
FIG. 4 illustrates another example screen shot of a graphical user interface that shows settings for a configuration file that is automatically populated with a value by the MFD via communication with networked MFDs.

In one embodiment, the user interface 210 may be a graphical user interface (GUI). The user interface 210 may be a touch screen interface or may be a GUI that receives inputs via a keyboard, mouse, a trackpad, and the like. The user interface 210 may be used to present the configuration file 114 to the user or technician via the display 112. Examples of the GUI and how the configuration file 114 is presented are illustrated in FIGS. 3 and 4 and discussed in further detail below.

In one embodiment, the timer 212 may be used to countdown a pre-defined amount of time after a user selects a field for a setting in the configuration file 114. The timer 212 may be optional. The timer 212 may be used such that pop-up windows or fields are not continuously populated. The technician or user may know the values for most of the settings in the configuration file 114. Thus, it may be distracting to have the values automatically populated or to have the pop-up window appear each time a field is selected. The timer 212 may provide some time (e.g., 10 seconds, 20 seconds, 30 seconds, and the like) to allow the technician to enter the known value for a setting. If the technician does not know the value, the technician may simply wait for the timer to expire without providing an input or value. Once the timer 212 expires, the MFD 104 may automatically populate the field with a value or present possible values to the technician for selection. The timer 212 may reset and restart each time the technician selects another field for another setting of the configuration file 114.

In one embodiment, the memory 204 may be any type of non-transitory computer readable medium. For example, the memory 204 may be a hard disk drive, a solid state drive, a random access memory, a read only memory, and the like. The memory 204 may store instructions 206.

In one embodiment, the instructions 206 may be executed by the processor 202 to perform the functions described herein to automatically populate parameters for configuration files via communication with networked MFDs. The instructions 206 may cause the processor 202 to perform operations of the method 500 illustrated in FIG. 5, and discussed in further detail below. In one embodiment, the memory 204 may also store the configuration file 114 and the configuration file settings value database 116.

FIG. 3 illustrates an example screen shot 300 of a graphical user interface (GUI) 302 that shows settings for the configuration file 114 that is automatically populated with a value by the MFD 104 via communication with networked MFDs 106, 108, and 110. In one embodiment, the configuration file 114 may be displayed in the GUI 302 presented by the display 112 of the MFD 104.

The configuration file 114 may include a plurality of different settings $304_1$ to $304_n$ (hereinafter also referred to individually as a setting 304 or collectively as settings 304). The settings 304 may include different settings for the MFD 104 to function properly. The settings 304 may be associated with network settings, driver settings, operating system settings, hardware settings, and the like. For example, the settings 304 may include port numbers and/or assignments, internet protocol (IP) addresses, domain name services (DNS) values, interface assignments, graphics settings, memory allocations, device configuration settings, peripheral device settings, passwords, power management values, and the like.

Each setting 304 may have a corresponding field $306_1$ to $306_n$ (hereinafter also referred to individually as a field 306 or collectively as fields 306). A user may move a pointer 308 or simply touch a field 306 (in the case of a touch screen GUI) to enter a value for the corresponding setting 304.

In one embodiment, when the user selects the field $306_3$ to enter a value for the setting $304_3$, the MFD 104 may populate a value in the field $306_3$ or the MFD 104 may present a pop-up window 310 with values 312 and 314. In one embodiment, the values 312 and 314 may be obtained from the configuration file settings value database 116. The database 116 may be generated by the MFD 104 by communicating with the other MFDs 106, 108, and 110 to receive values associated with the settings 304.

In one embodiment, when the user selects the field $306_3$, the MFD 104 may establish a communication session with at least one of the MFDs 106, 108, and 110 or with all of them. The MFD 104 may query the MFDs 106, 108, and 110 for a value that is used for the setting $304_3$. The MFDs 106, 108, and 110 may transmit the values for the setting $304_3$ used by the MFDs 106, 108, and 110.

In one embodiment, the MFD 104 may order the values 312 and 314 in the pop-up window 310. In one embodiment, the values 312 and 314 may be ordered from most used to least used. For example, the value 312 may be used by the greatest number of MFDs and the value 314 may be used by the fewest MFDs. For example, the value 312 may be used by the MFD 108 and 110, and the value 314 may be used by the MFD 106.

In one embodiment, the MFD 104 may order the values 312 and 314 using priority based on MFDs that have a same model number as the MFD 104. For example, the MFD 108 may have a same model number as the MFD 104. Thus, the MFD 104 may likely want to be configured similar to the MFD 108. Thus, the value 312 used by the MFD 108 with the same model number may be listed first, then the value 314 used by the other MFDs may be listed after. Notably, the value 314 may be used by a greater number of MFDs, but still be listed below the value 312 in this example.

The user may select a desired value 312 or 314 from the pop-up window 310. The MFD 104 may then populate the field $306_3$ with the value 312 or 314 that is selected by the user for the setting $304_3$.

In one embodiment, the timer 212 may be used to begin a countdown timer of a pre-defined expiration time period. The timer 212 may be used such that the pop-up window 310 is not shown for each field 306 that is selected. For example, it could become distracting if the user knows the value to input for some of the fields 306, but is constantly interrupted by the pop-up window 310. Thus, the timer 212 may wait the pre-defined expiration time period before presenting the pop-up window 312 with the values 312 and 314.

To illustrate, when the user selects a field 306, the timer 212 may be begin. If the MFD 104 detects an input before the timer expires, the MFD 304 may stop the pop-up window 310 from appearing. However, if the MFD 104 does not detect an input before the timer 212 expires, the MFD 104 may generate the pop-up window 310 with the values 312 and 314 using the methods described above.

In one embodiment, using the timer 212 may also allow the MFD 104 to obtain the values 312 and 314 from the other MFDs 106, 108, and 110. Thus, while the timer 212 is counting down, the MFD 104 may obtain the values 312 and 314 in the background and have those values 312 and 314 ready for presentation as soon as the timer 212 expires. Thus, the user may not experience any lag or wait times to see the values 312 and 314 in the pop-up window 310.

In one embodiment, the user may enter a key or right click on the field 306 and select help to immediately bring the pop-up window 310. For example, if the user does not know the proper value, the user may call the pop-up window 310 rather than waiting for the timer 212 to expire.

In one embodiment, after the user enters a value in the field $306_3$, the MFD 104 may check the value against the values for the setting $304_3$ stored in the database 116 or against the values received from the other MFDs 106, 108, and 110. If the value entered by the user does not match any of the values stored in the database 116 or received from the other MFDs 106, 108, and 110, the MFD 104 may generate a notification to present to the user. The notification may indicate to the user that the entered value may not be correct and present the pop-up window 310 to show the values 312 and 314 used by the other MFDs 106, 108, and 110. The user may then double check the entered value against the values 312 and 314 in the pop-up window 310 or select to continue with the entered value.

FIG. 4 illustrates another example screen shot 400 of the GUI 302 that shows settings for a configuration file 114 that is automatically populated with a value by the MFD 104 via communication with networked MFDs 106, 108, and 110. The screen shot 400 illustrates an embodiment, where a value 402 is automatically populated into the field $306_3$. For example, when the user selects the field $306_3$ with the pointer 308, the value 402 may be automatically populated. The user may then change the value 402 with a different value if the user wants to use a different value for the field $306_3$.

Thus, in the embodiment illustrated in FIG. 4, the user may simply click on the fields $306_1$-$306_n$ one-by-one to have each of the fields $306_1$-$306_n$ automatically populated. Thus, a user may input values for all of the fields $306_1$-$306_n$ with a single click rather than having to enter multiple keystrokes for the values. This may allow the user to complete the configuration file 114 much faster, if the automatically entered values 402 are acceptable to the user.

Thus, the MFDs of the present disclosure may automatically provide values for settings of configuration files of the MFDs and populate fields for the settings with the values. This may allow inexperienced technicians to quickly set values for the configuration file if the technician comes across settings that they are not familiar with.

Figure 5:
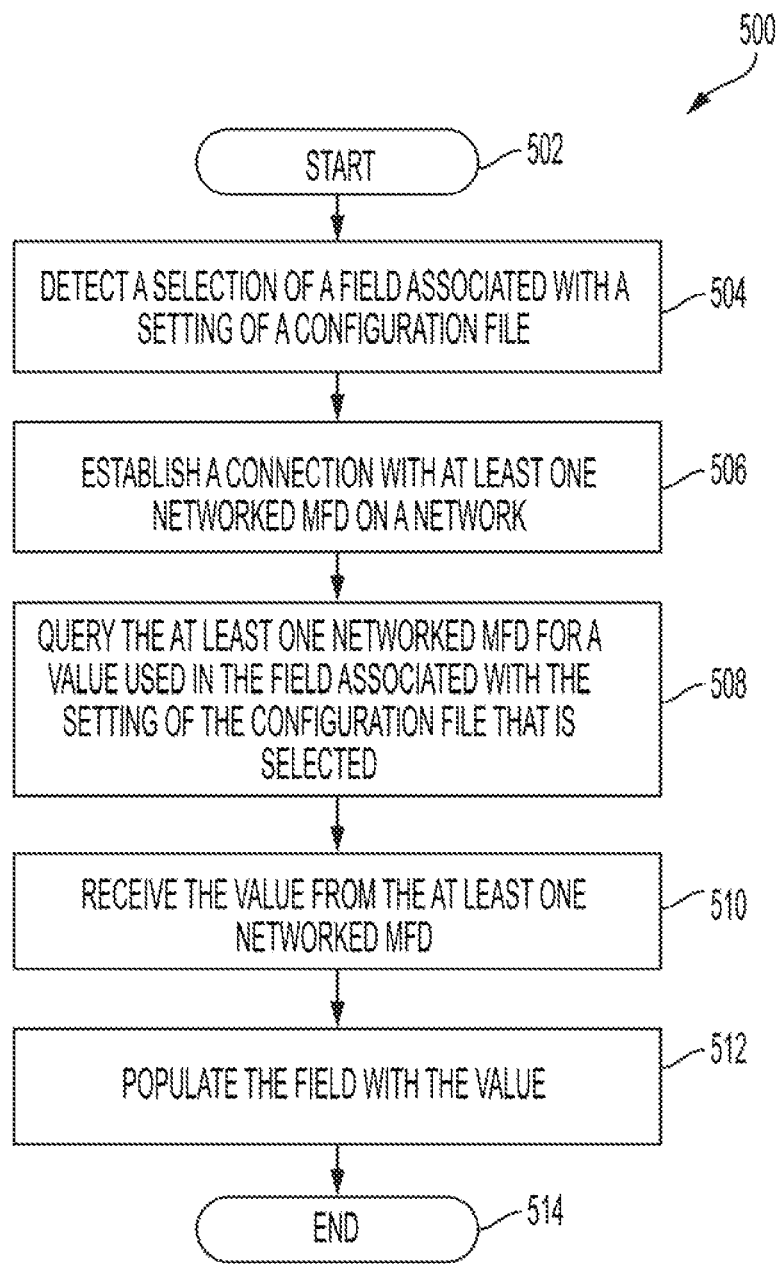
FIG. 5 illustrates a flow chart for a method of automatically populating parameters for configuration files via communication with networked MFDs of the present disclosure.

FIG. 5 illustrates a flow chart of an example method 500 for automatically populating parameters for configuration files via communication with networked MFDs of the present disclosure. In one embodiment, the method 500 may be performed by the apparatus 102 or by an apparatus such as the apparatus 600 illustrated in FIG. 6 and discussed below.

In one embodiment, the method 500 begins at block 502. At block 504, the method 500 detects a selection of a field associated with a setting of a configuration file. For example, a user may open a configuration file, and the configuration file may be presented in a GUI of the MFD. The user may select a field to enter a value for the setting.

At block 506, the method 500 establishes a connection with at least one networked MFD on a network. In one embodiment, in response to detecting the selection, the MFD may establish a communication session with other networked MFDs. In one embodiment, the MFD may establish a communication session with a plurality of networked MFDs. For example, the MFD may be connected to a same local network or enterprise network across several different geographic locations as the other networked MFDs. The connection may be a wired or wireless connection.

At block 508, the method 500 queries the at least one networked MFD for a value used in the field associated with the setting of the configuration file that is selected. For example, the MFD may determine the setting associated with the field selected by the user. The MFD may then query the other networked MFDs for the value that is used for the setting.

At block 510, the method 500 receives the value from the at least one networked MFD. The other networked MFDs may transmit the value to the MFD. In one embodiment, the values may be ordered by the MFD. For example, the values may be ordered from most used to least used. In one embodiment, the values may be ordered based on values used by other networked MFDs with the same model number as the MFD.

In one embodiment, the values may be presented to the user or technician in a pop-up window on the GUI. The user may select a value to enter in the field associated with a setting of the configuration file.

At block 512, the method 500 populates the field with the value. For example, the value selected by the user from the pop-up window may be used to populate the field. In one embodiment, the field may be automatically populated with a value received from the other networked MFDs. For example, instead of presenting the values to the user via the pop-up window, the MFD may automatically populate the field with the most used value or the value used by another MFD with the same model number. The user may then have the option to keep the value or enter another value.

Although the method 500 describes a method where the values are received from the other networked MFDs in response to selection of a field, the MFD may also receive the values in advance and store the values in a database. The MFD may then use values in the database to present values in a pop-up window that can be selected by a user or to automatically populate the fields for the settings in the configuration file. At block 514, the method 500 ends.

Figure 6:
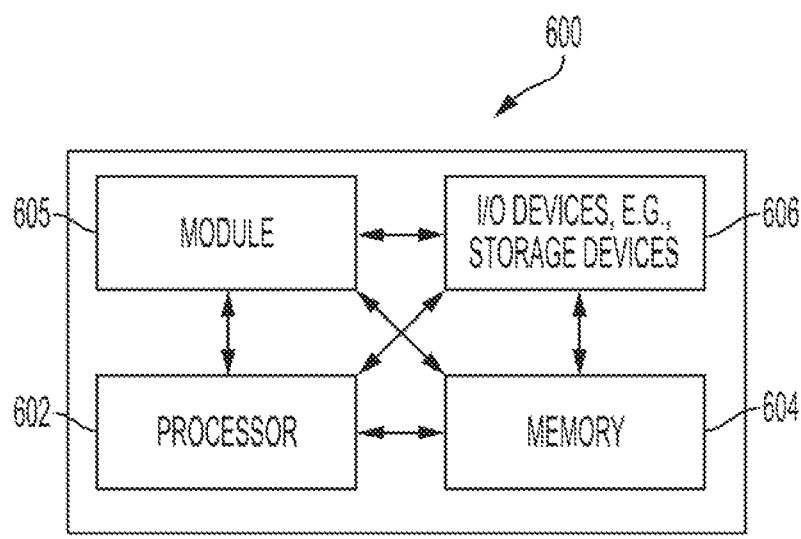
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for automatically populating parameters for configuration files via communication with networked MFDs, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for automatically populating parameters for configuration files via communication with networked MFDs (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for automatically populating parameters for configuration files via communication with networked MFDs (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD), comprising:
a communication interface to establish a communication path with a network;
a user interface to display a plurality of fields associated with different settings of a configuration file of the MFD;
a processor; and
a non-transitory computer-readable medium storing a plurality of instructions, which when executed by the processor, causes the processor to perform operations, comprising:
detect selection of a field associated with a setting of the configuration file;
establish a connection with at least one networked MFD on the network;
query the at least one networked MFD for a value used in the field associated with the setting of the configuration file that is selected;
receive the value from the at least one networked MFD; and
populate the field with the value.

2. The MFD of claim 1, wherein the at least one networked MFD comprises a plurality of networked MFDs.

3. The MFD of claim 2, wherein each MFD of the plurality of networked MFDs provides the value used in the field associated with the settings in the configuration file that is selected.

4. The MFD of claim 3, wherein the processor is to present values in a pop-up window on the user interface in an order of most used value to least used value.

5. The MFD of claim 4, wherein the processor is to populate the field with the most used value.

6. The MFD of claim 4, wherein the processor is to populate the field with a selected value selected by a user in the pop-up window.

7. The MFD of claim 3, wherein the processor is to:
query the plurality of networked MFDs for model numbers;
identify a subset of MFDs from the plurality of networked MFDs that have a same model number as the MFD based on the model numbers of the plurality of networked MFDs that are received; and
present values in a pop-up window on the user interface from the subset of MFDs that have the same model number as the MFD.

8. The MFD of claim 1, wherein the processor is further to:
generate a database with the value received from the at least one networked MFD;
present the database to a user when selection of the field is detected; and
receive a selection of the value from the database to populate the field with the value that is selected.

9. The MFD of claim 1, further comprising:
a timer with a pre-defined expiration time period, wherein the processor is to populate the field with the value when the pre-defined expiration time period expires after selection of the field is detected.

10. A method, comprising:
detecting, via a processor of a multi-function device (MFD), a selection of a field associated with a setting of a configuration file;
establishing, via the processor, a connection with at least one networked MFD on a network;
querying, via the processor, the at least one networked MFD for a value used in the field associated with the setting of the configuration file that is selected;
receiving, via the processor, the value from the at least one networked MFD; and
populating, via the processor, the field with the value.

11. The method of claim 10, wherein the at least one networked MFD comprises a plurality of networked MFDs.

12. The method of claim 11, wherein each MFD of the plurality of networked MFDs provides the value used in the field associated with the settings in the configuration file that is selected.

13. The method of claim 12, further comprising:
ordering, via the processor, values received from the plurality of MFDs in an order of most used value to least used value; and
presenting, via the processor, the values that are ordered in a pop-window on a user interface of the MFD.

14. The method of claim 13, further comprising:
populating, via the processor, the field with the most used value.

15. The method of claim 13, further comprising:
populating, via the processor, the field with a selected value selected by a user in the pop-up window.

16. The method of claim 11, further comprising:
querying, via the processor, the plurality of networked MFDs for model numbers;
identifying, via the processor, a subset of MFDs from the plurality of networked MFDs that have a same model number as the MFD based on the model numbers of the plurality of networked MFDs that are received; and
presenting, via the processor, values in a pop-up window on the user interface from the subset of MFDs that have the same model number as the MFD.

17. The method of claim 10, further comprising:
generating, via the processor, a database with the value received from the at least one networked MFD;
presenting, via the processor, the database to a user when selection of the field is detected; and
receiving, via the processor, a selection of the value from the database to populate the field with the value that is selected.

18. The method of claim 10, wherein the processor populates the field with the value when expiration of a timer is detected, wherein the timer starts when selection of the field is detected.

19. A multi-function device (MFD), comprising:
a communication interface to establish a communication path with a network;
a user interface to display a plurality of fields associated with different settings of a configuration file of the MFD;
a processor; and
a non-transitory computer-readable medium storing a plurality of instructions, which when executed by the processor, causes the processor to perform operations comprising:
detect selection of a field associated with a setting of the configuration file;
establish a connection with a plurality of MFDs on the network;

query the plurality of MFDs for a value used in the field associated with the setting of the configuration file that is selected;

receive values from the plurality of networked MFDs;

identify a most popular value that is used by one or more of the plurality of networked MFDs with a model number that is same as a model number of the MFD;

populate the field with the most popular value; and receive confirmation to save the most popular value in the field associated with the setting of the configuration file.

20. The MFD of claim 19, further comprising:

a timer with a pre-defined expiration time period, wherein the processor is to populate the field with the most popular value when the pre-defined expiration time period expires after selection of the field is detected.

* * * * *